(12) United States Patent
Ibison

(10) Patent No.: US 9,510,310 B1
(45) Date of Patent: Nov. 29, 2016

(54) TIME-ALIGNMENT OF SIGNALS

(71) Applicant: Altiostar Networks, Inc., Tewksbury, MA (US)

(72) Inventor: John N. Ibison, Bradford (GB)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/822,787

(22) Filed: Aug. 10, 2015

(51) Int. Cl.
*H04L 7/00* (2006.01)
*H04W 56/00* (2009.01)

(52) U.S. Cl.
CPC .................. *H04W 56/005* (2013.01)

(58) Field of Classification Search
CPC .... H04L 27/367; H03F 1/3241; H04B 15/00
USPC ......................... 375/296, 297, 371
See application file for complete search history.

(56) References Cited

U.S. PATENT DOCUMENTS

2012/0287980 A1* 11/2012 Epifano ............... H04W 56/00
375/224

* cited by examiner

*Primary Examiner* — David S Huang
(74) *Attorney, Agent, or Firm* — Mintz Levin Cohn Ferris Glovsky and Popeo, P.C.

(57) ABSTRACT

Data characterizing a first signal and a second signal can be received. A first stream of bits for the first signal and a second stream of bits for the second signal can be calculated based on the received data. Each bit in the first stream of bits can characterize a slope of a power of the first signal and each bit in the second stream of bits can characterize a slope of a power of the second signal. The first stream of bits and the second stream of bits can be compared bitwise at a plurality of time-alignment differences for matching bits. Based on the comparing a final time-alignment difference between the first signal and the second signal can be determined. At least one of the receiving, the calculating, the comparing, and the determining can be performed by at least one processor of at least one computing system.

12 Claims, 11 Drawing Sheets

TIME-ALIGNMENT OF SIGNALS

TECHNICAL FIELD

The subject matter disclosed herein generally relates to transmission of data and, in particular, to time-alignment of signals, such as those related to the transmission of digitally encoded voice or data signals.

BACKGROUND

Many amplifiers have transfer characteristics having a linear operating region and a non-linear operating region. Once the non-linear portion of the transfer characteristic of any amplifier is reached, any increase in input will not be matched by a proportional increase in output and gain compression occurs. Gain compression is a reduction in differential or slope gain caused by nonlinearity of the transfer function of the amplifying device. This nonlinearity may be caused by heat due to power dissipation, by overdriving the active device beyond its linear region, or other reasons.

Pre-distortion is a technique used to improve the linearity amplifiers, such as radio transmitter amplifiers. Pre-distortion inversely models the amplifier's gain and phase characteristics and, when combined with the amplifier, produces an overall system that is more linear and reduces the amplifier's distortion. In essence, inverse distortion is introduced into the input of the amplifier, thereby cancelling any non-linearity the amplifier might have.

SUMMARY

In an aspect, data characterizing a first signal and a second signal can be received. A first stream of bits for the first signal and a second stream of bits for the second signal can be calculated based on the received data. Each bit in the first stream of bits can characterize a slope of a power of the first signal and each bit in the second stream of bits can characterize a slope of a power of the second signal. The first stream of bits and the second stream of bits can be compared bitwise at a plurality of time-alignment differences for matching bits. Based on the comparing a final time-alignment difference between the first signal and the second signal can be determined. At least one of the receiving, the calculating, the comparing, and the determining can be performed by at least one processor of at least one computing system.

One or more of the following features can be included in any feasible combination. For example, at each of the plurality of time-alignment differences, a sum of matching bits can be determined. Determining the final time-alignment difference can include estimating a maximum match by interpolating the sum of matching bits at each of the plurality of time-alignment differences to determine the final time-alignment difference where the sum of matching bits is at a maximum. Determining the final time-alignment difference can include estimating a maximum match by fitting straight lines to the sum of matching bits over the plurality of time-alignment differences near a peak of the sum of matching bits. The final time-alignment difference can include a coarse time-alignment difference and a fractional time-alignment difference. The coarse time-alignment difference can be an integral delay corresponding to one of the plurality of time-alignment differences having the largest number of matching bits and the fractional time-alignment difference can be determined by interpolation or line-fitting of the sum of matching bits at the plurality of time-alignment differences. The first signal and the second signal can be aligned in time by delaying one of the first signal and the second signal by the final time-alignment difference. The first signal can be a complex valued data signal for transmission in a radio transmitter. Coefficients for digital pre-distortion or quadrature modulation error-correction (QMC) of the first signal can be computed using the final time-alignment difference.

Computer program products are also described that comprise non-transitory computer readable media storing instructions, which when executed by at least one data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

An exemplary radio transmitter can use digital pre-distortion ("DPD") to allow transmission of a better quality signal at a higher power. Calculation of the pre-distortion relies on matching a copy of the (clean) input signal with the (distorted) amplified signal and then determining how best to pre-distort. To make the signal comparison meaningful, the input and the amplified signals can be time-aligned—so that the differences in the two signals is due to distortion and not simply due to sampling the signal at a different point in time. The ability to align the fragments of signal accurately can be an initial step in the calculation of the signal pre-distortion.

In some example implementations, a time-alignment between complex signals can be estimated by comparing sample-by-sample whether the signals are both increasing or decreasing in power (e.g., the slope) to create a match score. Match scores can be determined across a range of possible time-alignments and the possible time-alignment that results in the best match between signals can be a coarse estimated time-alignment. Additionally, interpolation and/or line fitting can be applied to the series of match scores to determine a fine estimated time-alignment that falls between samples.

More specifically, in some example implementations, signals can be time-aligned by generating a signature bit-stream for each signal based on whether the signals are decreasing or not (e.g., the slope) in power. The signature bit-streams can be, for example, 1's when the respective signal is increasing and 0's when the respective signal is decreasing. The signature bit-streams for each signal can be compared sample-by-sample (e.g., bitwise) to determine how well they match. Bitwise summing of occurrences of when the bit-streams are equal can create the match score. The comparison can be performed across a number of possible time-alignments to create a match score for each possible time-alignment. The final estimated time alignment can be determined from the series of match scores, for example, by finding a maximum (e.g., peak) match score though interpolating the match scores, line fitting, selecting the nearest computed match score to a peak in the series of match scores, and the like.

Figure 1:
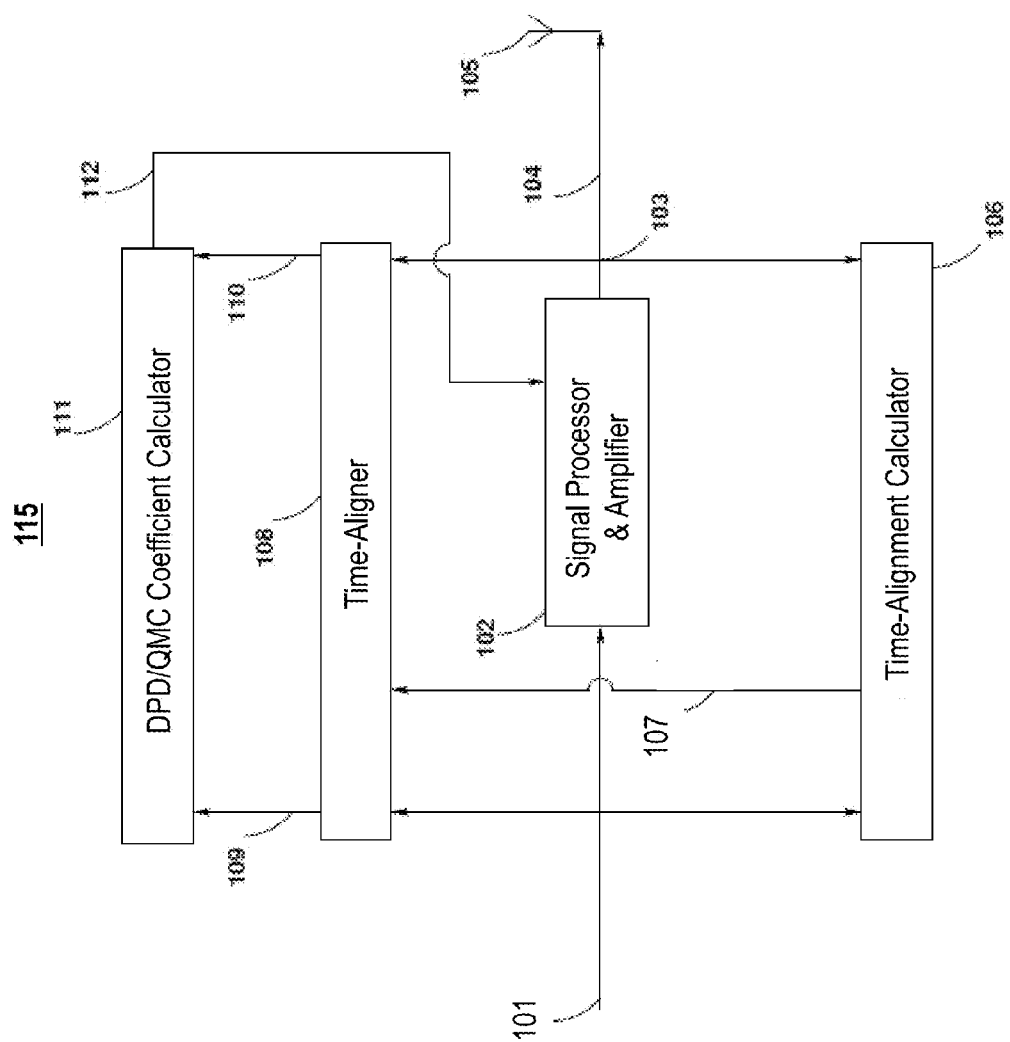
FIG. 1 is a functional block diagram illustrating an example system for determining time-alignment of a baseband signal and an amplified signal, in accordance with some example implementations.

FIG. 1 is a functional block diagram illustrating an exemplary system 115 for determining a time-alignment of a baseband signal 101 and an amplified signal 103 in a radio transmitter that uses DPD to enhance the baseband signal 101 before transmission, according to some implementations of the current subject matter. The complex baseband signal 101 can enter a signal processor and amplifier 102. The signal processor and amplifier 102 can introduce an unknown delay into the amplified signal 103 with respect to the input baseband signal 101 (e.g., the delay may vary with temperature, operating frequency, and the like). An attenuated form of the amplified signal 103 can be captured and a main transmission signal 104 can be sent to an antenna 105 and broadcast. The baseband signal 101 and amplified signal 103 can be supplied to a time-alignment calculator 106, which can calculate (e.g., estimate) a time-alignment difference 107 between baseband signal 101 and amplified signal 103.

Time-aligner 108 can, using the calculated time-alignment difference 107, align baseband signal 101 and amplified signal 103 in time. Time-aligner 108 can output two time aligned signals, a time aligned baseband signal 109 and a time-aligned amplified signal 110. These signals can be used for additional processing, such as by DPD and quadrature error-correction ("QMC") coefficient calculator 111. These coefficients 112 can be used as input into the signal processor and amplifier 102.

In the example system 115 of FIG. 1, with respect to time-aligner 108, alignment in time of the baseband signal 101 and the amplified signal 103 can occur in the time-aligner 108 by splitting the to-be-determined time-alignment value into two parts—an integral delay corresponding to an integral number of sample points and a fractional delay, which is less than one sample point in duration. A (2N+1)-tap fractional delay filter can be applied to amplified signal 103, which consumes N samples at the start and at the end of the amplified signal 103 producing a shorter fractionally-delayed signal. If the integral time-alignment delay exceeds filter length N the remaining integral number of samples can be removed from the start of the amplified signal 103, which is delayed with respect to the baseband signal 101. Otherwise, the remaining integral number of samples can be removed from the start of the baseband signal 101.

The fractional delay filter can be a (2N+1)-tap windowed sinc filter where a is a fractional part of the time-alignment delay. The sinc filter can be described as $$F_k = W_k \frac{\sin 2\pi(k-a)}{2\pi(k-a)} \quad (1)$$

where $W_k$ is a suitable windowing function (e.g. a Hamming window).

Time-aligner 108 can be used by any system that requires time-aligned signals since it can convert raw signals from the input and output of signal processing and amplifiers into a pair of time-aligned signals.

Figure 2:
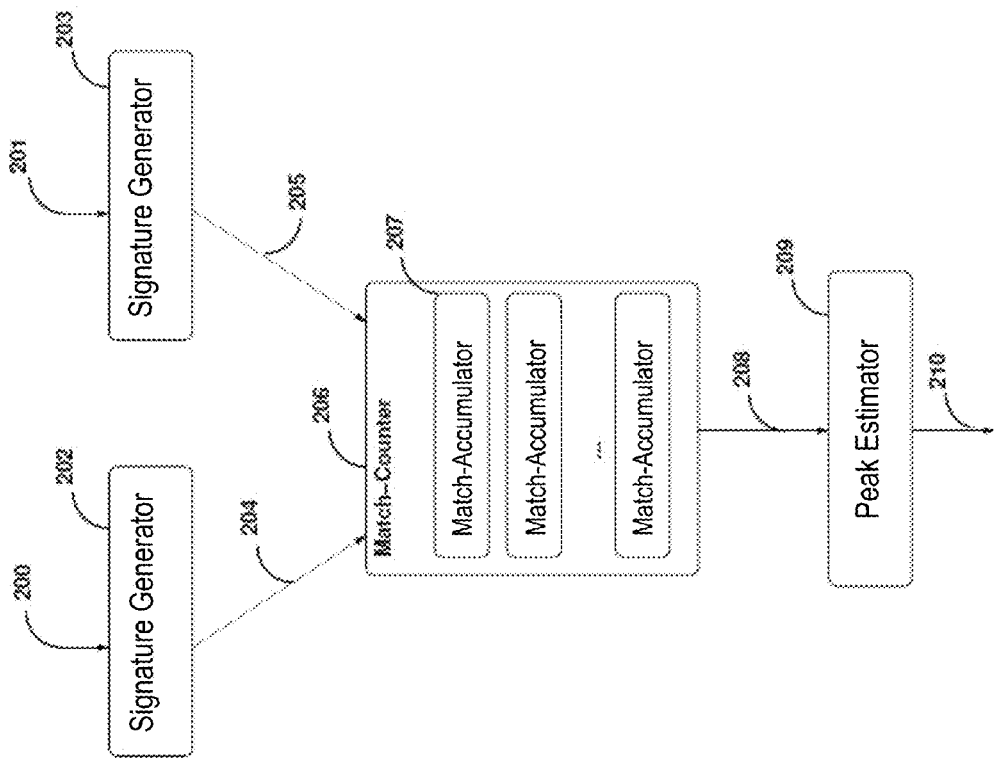
FIG. 2 is a functional block diagram illustrating an example implementation of a time-alignment determination system for estimating or calculating time-alignment between two signals.

FIG. 2 is a functional block diagram illustrating a time-alignment determination system 212 for estimating or calculating time-alignment between two signals, according to some implementations of the current subject matter. The time-alignment determination system 212 can be an example implementation of the time-alignment calculator 106. An amplified signal 200 can be fed into a signature-generator 202, which can generate a signature or bit-stream from the amplified signal 200 that characterizes the slope of the power of the amplified signal 200.

Figure 3:
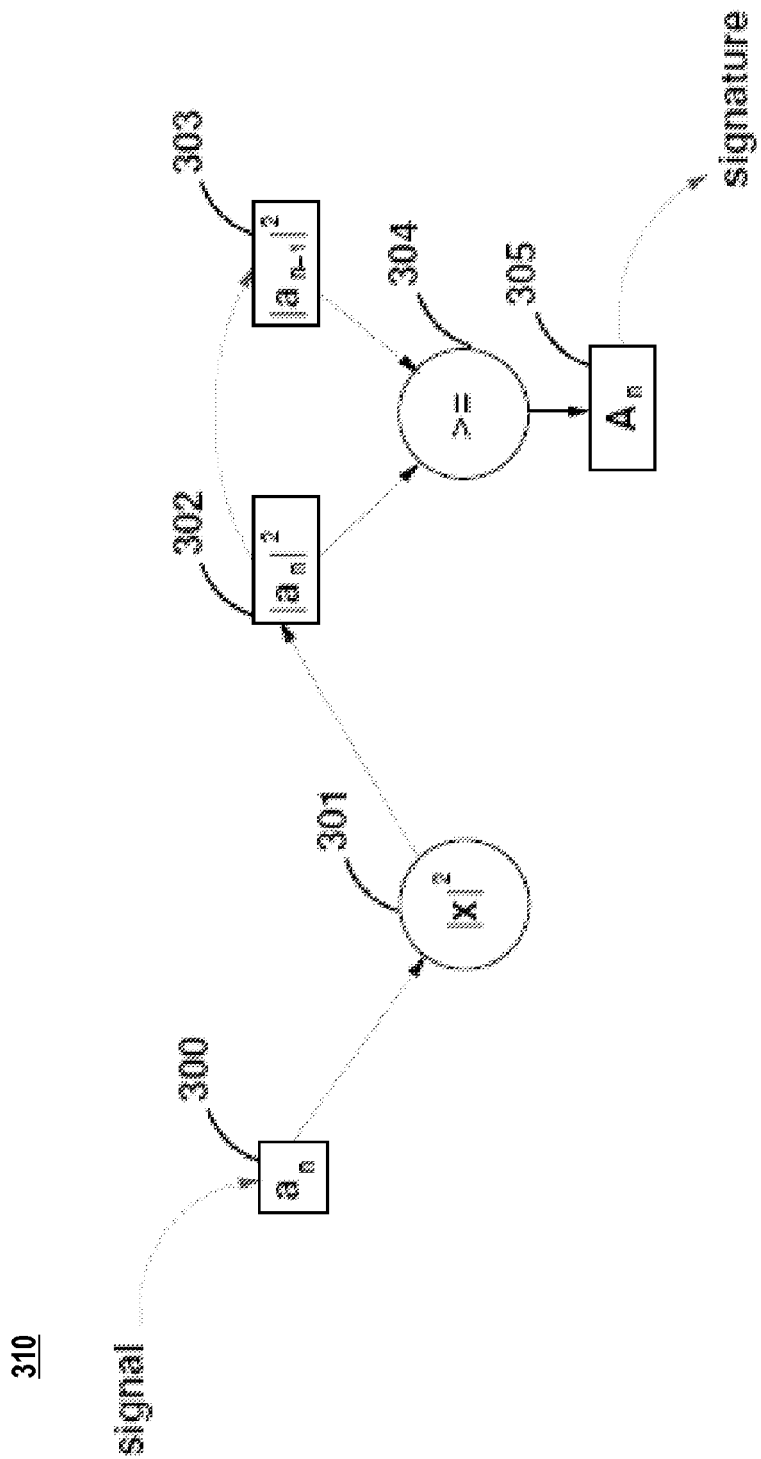
FIG. 3 is a state machine diagram illustrating an example implementation of a signature generator for generating a signature bit-stream from an input signal.

FIG. 3 is a state machine diagram illustrating an exemplary signature generator 202 for generating a signature bit-stream from an input signal, according to some implementations of the current subject matter. A sampled signal 300 ($a_n$) can be fed into 301, which calculates the power of the sampled signal 300 ($|a_n|^2$). The result can be stored in a current-sample register (or memory) 302. The stored power of the sampled signal 300 ($|a_n|^2$) can, at block 304, be compared with a power result of a previous sample ($|a_{n-1}|^2$) stored in prior-sample register 303. If the value of current-sample register 302 ($|a_n|^2$) exceeds or equals that of prior-sample register 303 ($|a_{n-1}|^2$) then a 1 can be emitted into a stream 305 of bits. Otherwise, a zero can be emitted into the stream 305 of bits. The next sample can be input as 300 and the contents of current-sample register 302 can be shifted into prior-sample register 303. In some implementations, the current-sample register 302 and prior-sample register 303 can be initialized to zero.

Mathematically and in some implementations, for a sampled signal $z_k$ (k=0, 1, 2, . . . ), the signature bit-stream can be calculated as follows:

$$sig(z)_k = \begin{cases} 1 & \text{if } k = 0 \text{ or } |z_k|^2 \geq |z_{k-1}|^2 \\ 0 & \text{otherwise} \end{cases} \quad (2)$$

Thus the signature bit-stream can characterize the sampled signal 300 as increasing or decreasing for any given point in time (e.g., any given sample).

Using uppercase for a signature and lowercase for input signal, an x-signature (or bit-stream) derived from the baseline signal can be expressed as $$X_k = sig(x)_k \quad (3)$$

The y-signature (or bit-stream) derived from the amplified signal can be expressed as $$Y_k = sig(y)_k \quad (4)$$

Referring again to FIG. 2, signature generators 202 and 203 can output the y-signature 204 and the x-signature 205, respectively, to match-counter 206, which takes the y-signature 204 and x-signature 205 and uses multiple instances of a match-accumulator 207 to count bitwise how many times the two signatures match. The match-counter 206 can generate a sequence of scores 208.

Figure 4:
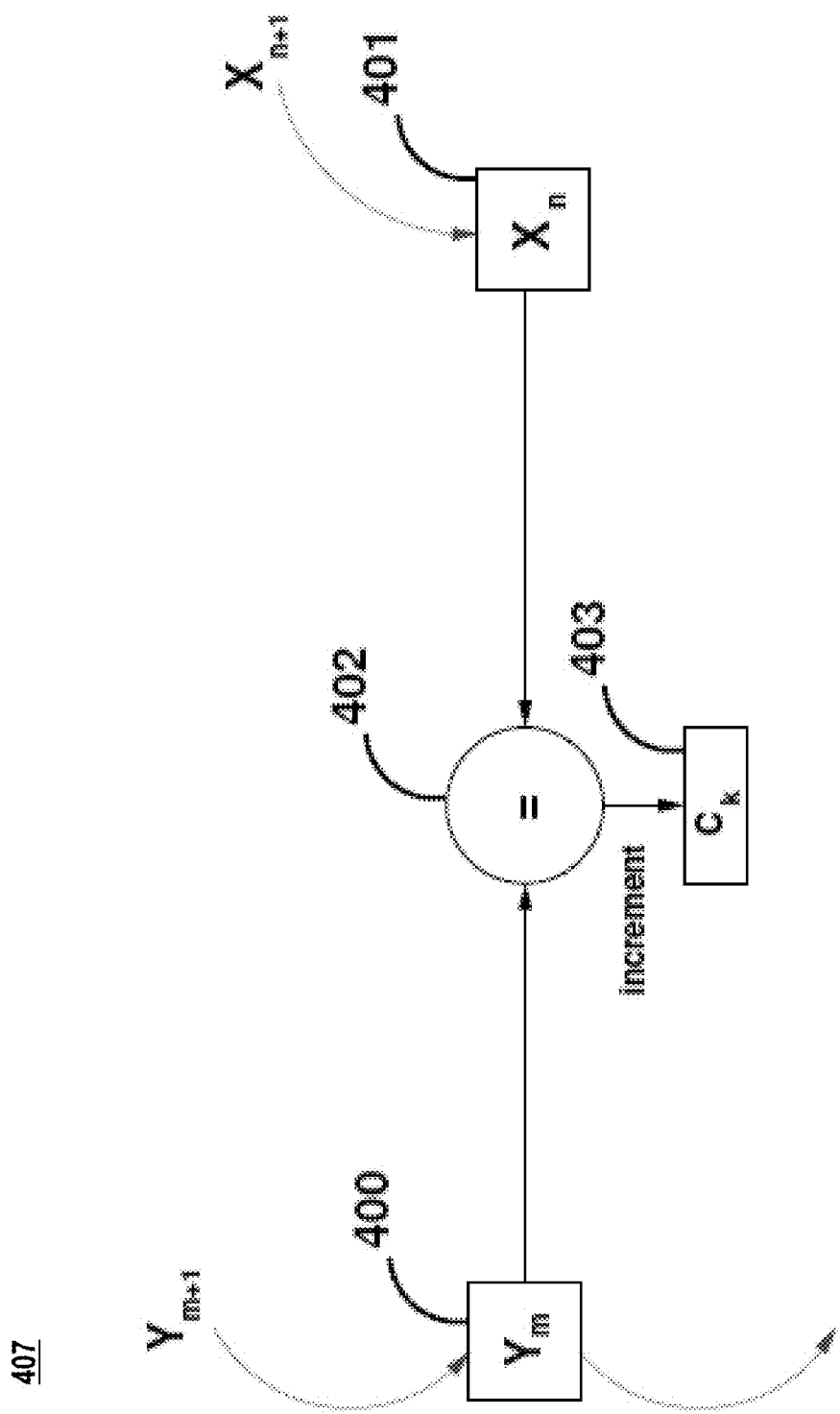
FIG. 4 is a state diagram illustrating an example implementation of a match accumulation system.
Figure 5:
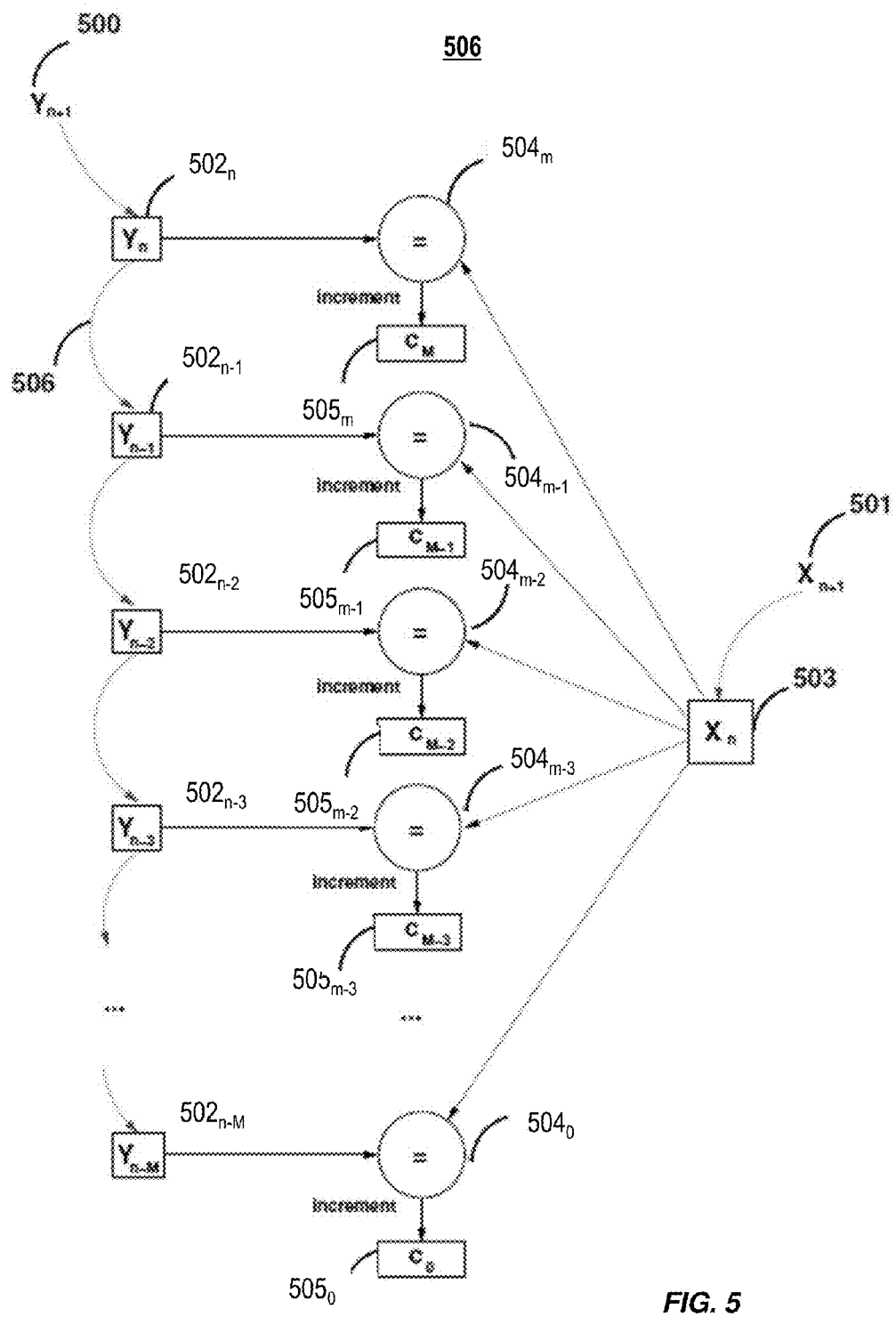
FIG. 5 is a state diagram illustrating an example implementation of a match-scorer implemented as multiple parallel match-accumulation systems.

FIG. 4 is a state diagram illustrating an exemplary match accumulation system 407, which can be an example implementation of a match-accumulator 207, according to some implementations of the current subject matter. FIG. 5 illustrates an exemplary match-scorer 506, which can be an example implementation of a match-counter 206, according to some implementations of the current subject matter. In some example implementations, to determine how well two signature bit-streams match, the number of matching bits can be counted. The time where the X and Y signatures have the closest match can be found by shifting one signature across the other and counting matching bits.

Mathematically, these operations can be expressed as $$S(n) = \sum_{k=0}^{N} eq(Y_{k+n}, X_k) \quad (5)$$

where eq is the equality operator:

$$eq(a, b) = \begin{cases} 1 & \text{if } a = b \\ 0 & \text{otherwise} \end{cases} \quad (6)$$

A fixed length N can be chosen so that all comparisons of the two signature bit-streams occur over the same number of bits.

Referring again to FIG. 4, two signature bits—one from the y-signature 400 and the other from the x-signature 401—are compared. If the two bits match then a comparison block 402 increments a counter in memory 403. If the bits are different then the counter in memory 403 is not incremented.

Multiple instances of the match-accumulation system 407 can be implemented in parallel so that a range of bit scores can be calculated. As shown in FIG. 5, the match-scorer 506 can be implemented as multiple parallel (M) match-accumulation systems 407. Each instance of the match-accumulate machine can have an associated register to hold a y-signature bit $502_k$ (k=1, 2, . . . , M) and a memory to hold a score $c_k$ $505_k$, (k=1, 2, . . . , M). A single register can hold an x-signature bit 503. Comparison block $504_k$ can compare the y-signature bit $502_k$ to the x-signature bit 503 and store the result as score $c_k$ in memory $504_k$. In this manner, a single x-signature bit can be compared in parallel to a range or series of bits in the y-signature bit-stream for multiple different time-alignments.

In some example implementations, the number of implemented instances of the match-accumulation system 407 can define a search range for the time-alignment. M+1 match-accumulation systems 407 can allow for a search for the time-alignment in a window M−8 samples. (In one example implementation, the loss of 8 samples is due to the filtering done by Peak Estimator 209 being inaccurate over 4 samples at each end of the window.)

For a physical device, the time-alignment is typically known to lie within certain bounds—since the time delay represents the time it takes a processing system to process a signal between two points. The precise time-alignment value is often temperature or frequency dependent and so it is affected by environmental factors. For a given piece of equipment in use within its operating range it is reasonable to search for a true time-alignment between two fixed bounds. Assuming the time-alignment value can be in the range p to q, an extended range [to, hi] to search can be defined as:

$$lo = p - 4$$

$$hi = q + 4 \quad (7)$$

M can be defined as:

$$M = hi - lo \quad (8)$$

The exemplary match-scorer 506 shown in FIG. 5 can be initialized to use M+1 match-accumulation systems 407 where: the counter memories $c_M, c_M, \ldots c_O$ can be initialized to zero; the y-signature bit registers $Y_n, Y_{n\_i}, \ldots Y_{n\_M}$ can be initialized to the y-signature bits $Y_{hi}, Y_{hi\_i}, \ldots, Y_{lo}$ respectively; and the x-signature bit register 503 can be initialized to x-signature bit $X_{lo}$.

The match-accumulate machines can then increment their counters according to the comparison of their respective signature bits. The next y-signature bit 500 can be clocked in to register $502_N$, the value of which is shifted (506) to register $507_{n-1}$ at the same time a new x-signature bit 501 is clocked into register 503. Once N bits have been consumed the scores generated in the counter memories $505_k$, form a score sequence.

Referring again to FIG. 2, the sequence of scores 208 generated by the match-counter 206 can be processed by peak estimator 209 to find the peak or maximum score that will be used as the final time-alignment value. In some implementations, the final time-alignment value can be the maximum computed score. In some implementations, to improve accuracy to be better than one sample interval if the scores around the peak are well fitted by two straight lines then an intersection of these lines can be used as the time-alignment point. If a straight-line fit is not well fitted (e.g., below a configured metric threshold) the score sequence can be interpolated to find a location of a peak of the interpolated scores. The selected peak point can be used as the final time-alignment value.

In some example implementations, scores being well fitted with straight lines can be those having a score that is at least half of the signature length N used in the signature comparison. Also, the score values on each side of the peak can be monotonically increasing (on the left) and decreasing (on the right). If there are less than 3 points in either set then interpolation can be used instead.

Given the Match Scores:

$$S_{lo}, S_{lo+1}, \ldots, S_{hi} \quad (9)$$

where $S_{lo}$ is a score from matching signatures offset by time lo. The score values for line-fitting can be selected as follows—where N is the signature match length:

$$L = \left\{ (k, S_k) \text{ such that } k < M \text{ and } S_k < S_{k+1} \text{ and } S_k \geq \frac{N}{2} \right\} \quad (10)$$

$$R = \left\{ (k, S_k) \text{ such that } k > M \text{ and } S_k > S_{k+1} \text{ and } S_k \geq \frac{N}{2} \right\}$$

If either of the sets L and R has less than two points interpolation can be used instead of line fitting.

For each or L and R the best-fit straight line through them can be found by least-squares estimation on the error:

$$\begin{pmatrix} \sum_k k^2 & \sum_k k \\ \sum_k k & \sum_k 1 \end{pmatrix} \begin{pmatrix} a \\ b \end{pmatrix} = \begin{pmatrix} \sum_k S_k k \\ \sum_k S_k \end{pmatrix} \quad (11)$$

This gives:

$$S = a_L k + b_L$$

$$S = a_R k + b_R \quad (12)$$

The shortest distance of the peak point (M, SM) to each line. The point (M, SM) can be added to whichever set of points lies closest to the line of best fit—or to L if both distances are equal. The best fit line can then recalculated for each updated set.

The dimensionless total relative error E can be calculated as:

$$E = \frac{1}{\sum_{k \in L \cup R} S_k^2} \left\{ \sum_{k \in L} (S_k - a_L k - b_L)^2 + \sum_{k \in R} (S_k - a_R k - b_R)^2 \right\} \quad (13)$$

If E is below a configured or predetermined threshold then the intersection of the two lines-of-best-fit can be found by:

$$T_a = \frac{b_L - b_R}{a_R - a_L} \quad (14)$$

The value $T_a$ can be taken as the final time-alignment value (e.g., 210 and 107 in FIGS. 2 and 1, respectively).

In some implementations, interpolation can be performed (e.g., if line-fitting is not possible or if the error E is above a configured or predetermined threshold). The score sequence can be interpolated using an up-sample and filter method, where G zeros can be inserted between each score and the result filtered with a low-pass filter. The time corresponding to a peak of the interpolated scores can then be taken as the final time-alignment value (e.g., 210 and 107 in FIGS. 2 and 1, respectively). When a filter is used for interpolating, the interpolated scores at the start and end of the range may not be reliable, so the search range for the time-alignment point can be extended.

In some implementations, a combined fit of two straight lines having gradients of equal magnitude but opposite sign can be used to determine the final time-alignment value. If k is the value of offset between signatures and $S_k$ is the number of matching bits in signatures, a combined fit of two straight lines but restraining the gradients to be equal in magnitude can be performed by defining a subset of the (k, $S_k$) in the linear regions around the peak. Letting a be an offset of the maximum match value, choose p which takes value around a. Error in the dual line fit can be defined as $$E(p) = \frac{1}{N} \left( \sum_{k \leq p} (Ak + B - S_k)^2 + \sum_{k > p} (-Ak + C - S_k)^2 \right) \text{ where} \quad (15.1)$$

$$N = \sum_{all\, k} 1$$

The values of (A, B, C) which minimize the error can be expressed as $$\begin{pmatrix} A \\ B \\ C \end{pmatrix} = H^{-1} K \quad (15.2)$$

Where $$H = \begin{pmatrix} \sum_{all\, k} k^2 & \sum_{k \leq p} k & -\sum_{k > p} k \\ \sum_{k \leq p} k & \sum_{k \leq p} 1 & 0 \\ -\sum_{k > p} k & 0 & \sum_{k > p} 1 \end{pmatrix} \quad (15.3)$$

And $$Z = \begin{pmatrix} \sum_{k \leq p} k S_k - \sum_{k > p} k S_k \\ \sum_{k \leq p} S_k \\ \sum_{k > p} S_k \end{pmatrix} \quad (15.4)$$

Values of (A,B,C) can be substituted into the error definition and a value $p_0$, which minimizes error $E(p_0)$ can be found. The intersection of the two lines gives the fractional time alignment value. They can intersect at $k_0$, where $$Ak_0 + B = -Ak_0 + C \quad (15.5)$$

Giving $$k_0 = \frac{C - B}{2A} \quad (15.6)$$

In some example implementations, when a radio transmitter is initialized (e.g., first starts), there may be considerable quadrature modulation error because this error has not been corrected for. The most noticeable effect can be that of a local oscillator manifesting itself as a non-zero mean value. To improve accuracy for initial time alignments, (e.g., before any QMC has been performed), the baseband signal 101 and amplified signal 103 can have their means removed. The mean removal can be expressed as:

$$x_k \mapsto x_k - E[x] \text{ where} \quad (16)$$
$$E[x] = \frac{1}{N} \sum_{k=0}^{N-1} x_k$$

Figure 6:
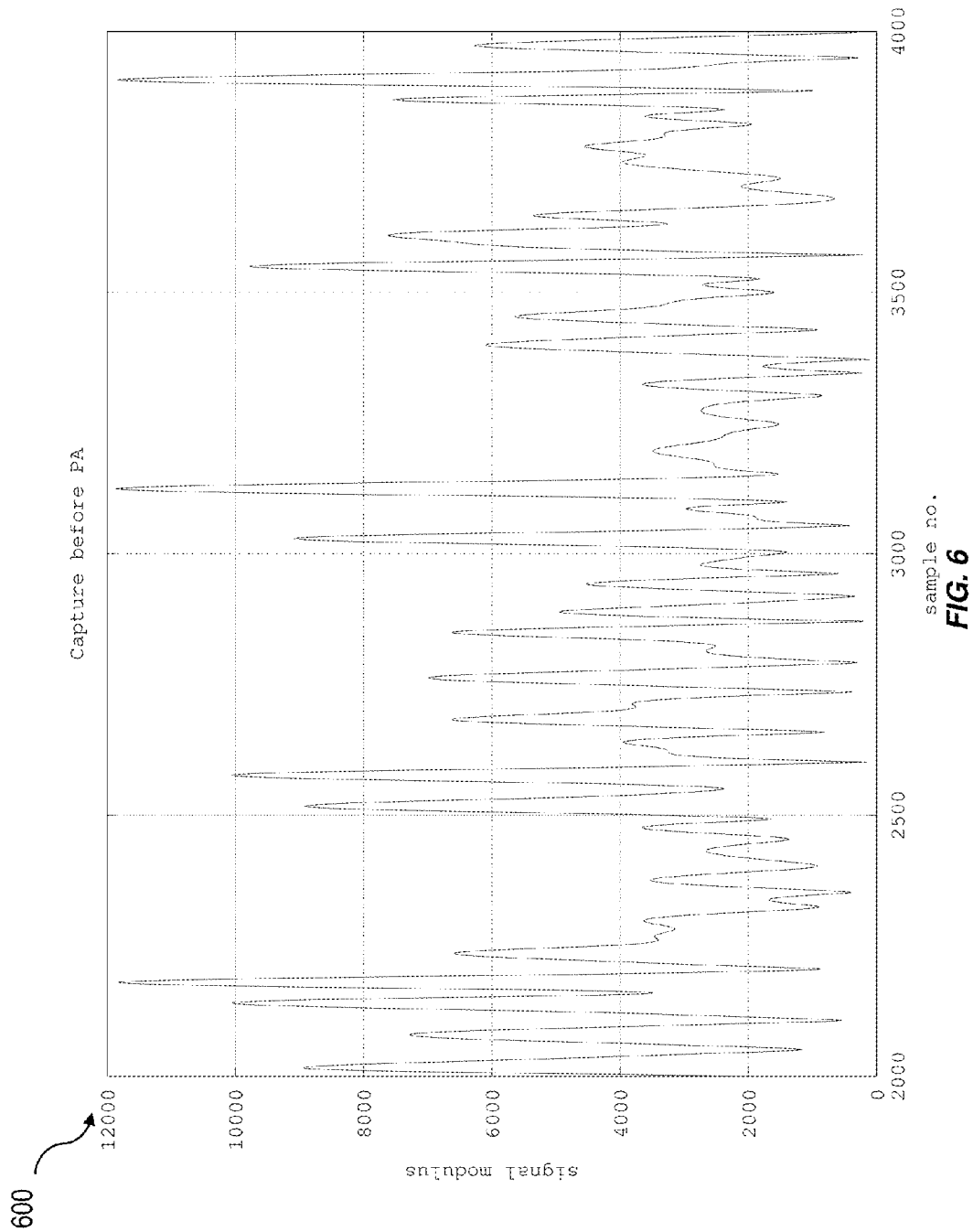
FIG. 6 is a plot of an example baseband signal in which magnitude is shown on the vertical axis and sample number on the horizontal axis, in accordance with some example implementations.
Figure 7:
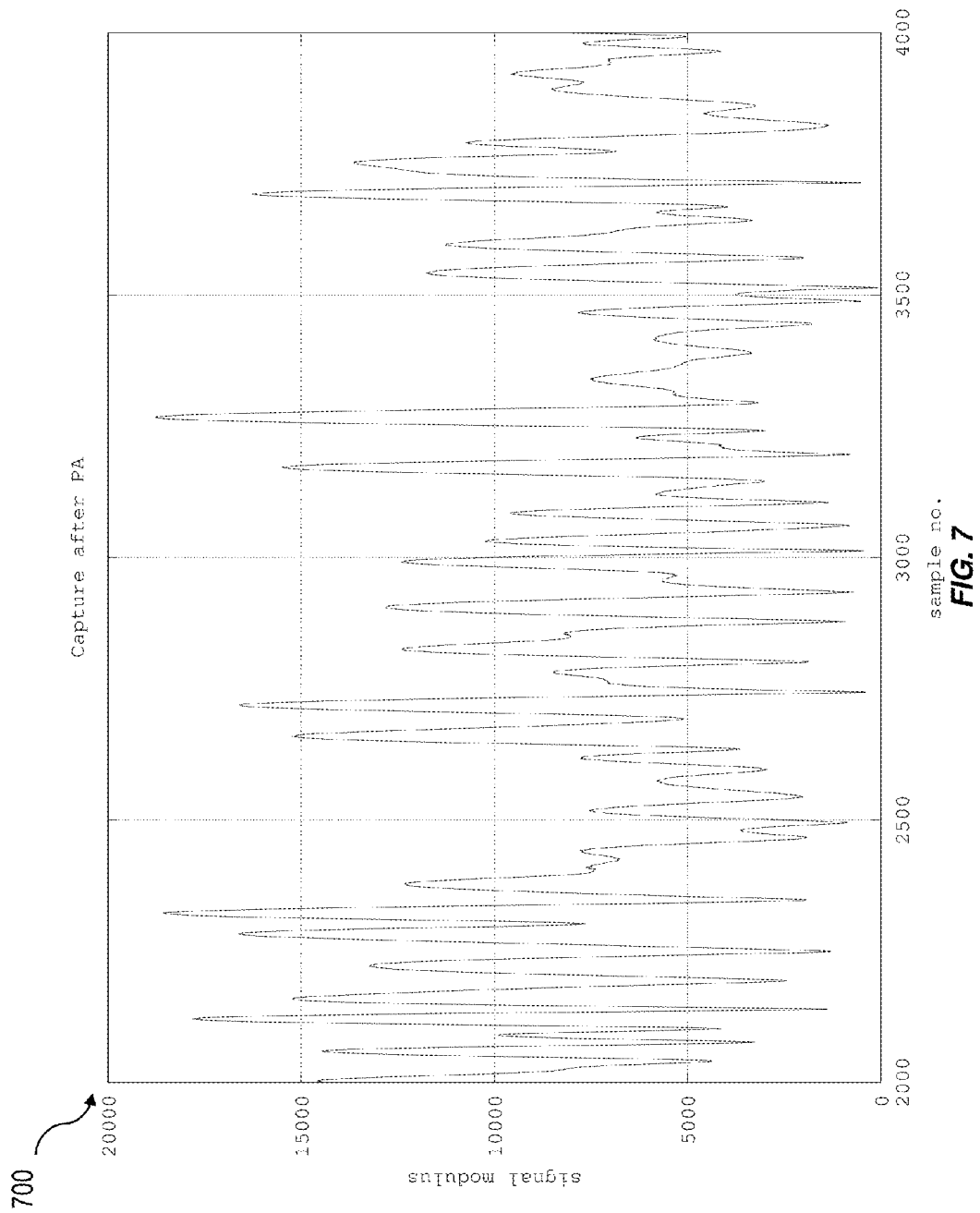
FIG. 7 is a plot of an example amplified signal corresponding to the example baseband signal of FIG. 6, in accordance with some example implementations.

FIG. 6 is a plot 600 of an exemplary baseband signal 101 in which magnitude is shown on the vertical axis and sample number on the horizontal axis, according to some implementations of the current subject matter. FIG. 7 is a plot 700 of an exemplary amplified signal 103 corresponding to the example baseband signal 101 of FIG. 6 (e.g., having been processed in the signal processor and amplifier 102 of the example implementation of FIG. 1), according to some implementations of the current subject matter. Magnitude is shown along the vertical axis and sample number is shown along the horizontal axis. The amplified signal 103 of FIG. 7 does not exhibit much distortion when compared to the baseband signal 101 of FIG. 6 and so are very similar in magnitude but have a noticeable sample offset (e.g., delay) of about 100 samples.

Figures 8A, 8B:
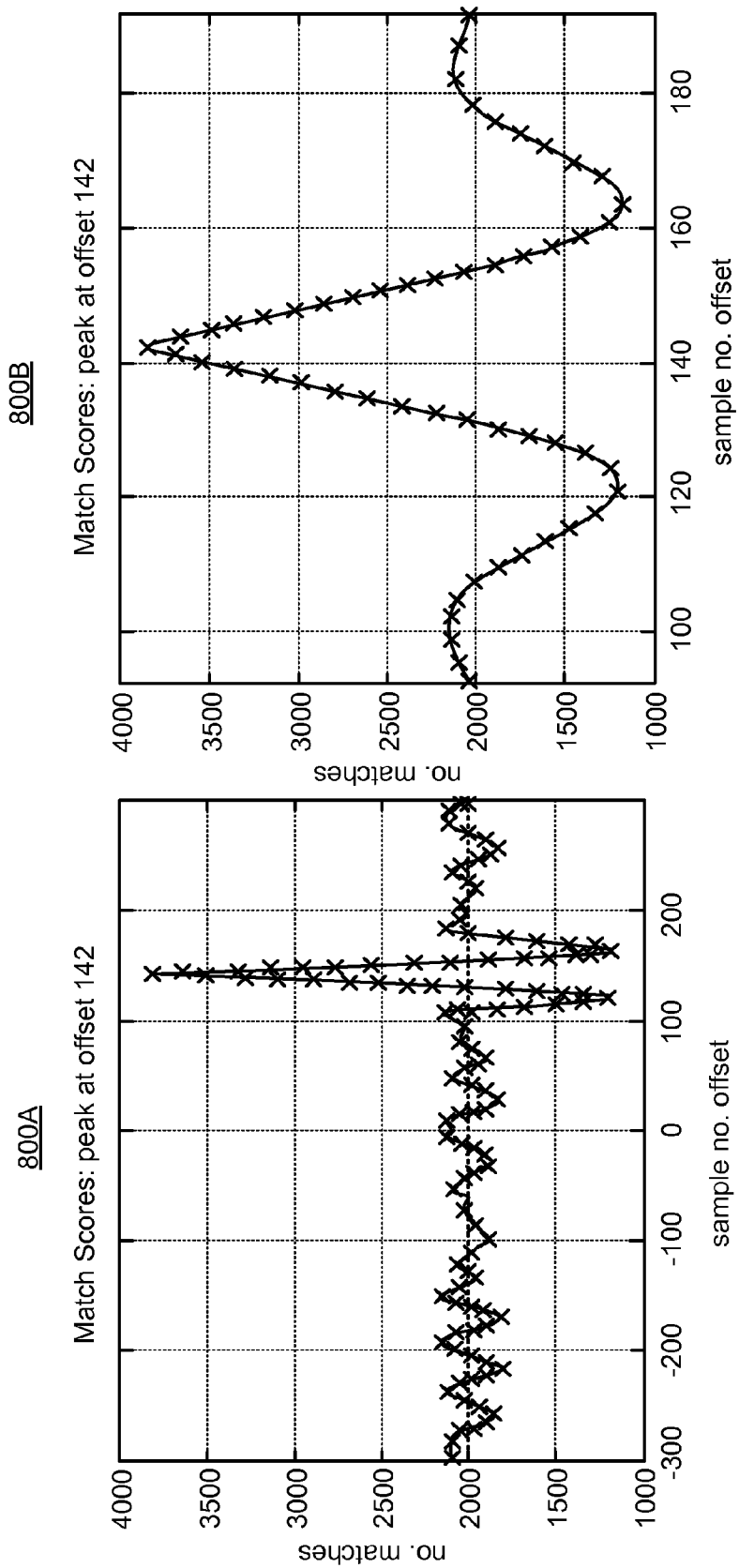
FIG. 8A-8B are plots of example score sequences.

FIG. 8A is a plot 800A of an exemplary score sequence 808 (e.g., example of sequence of scores 208) generated in the example implementation of FIG. 1 with the baseband signal 101 and amplified signal 103 of FIGS. 6 and 7, according to some implementations of the current subject matter. FIG. 8B is another plot 800B of a second exemplary score sequence. The count (or score) is illustrated along the vertical axis and the time-delay (in units of sample number) is illustrated along the horizontal axis. The peak score sample is illustrated at 810.

Figure 9:
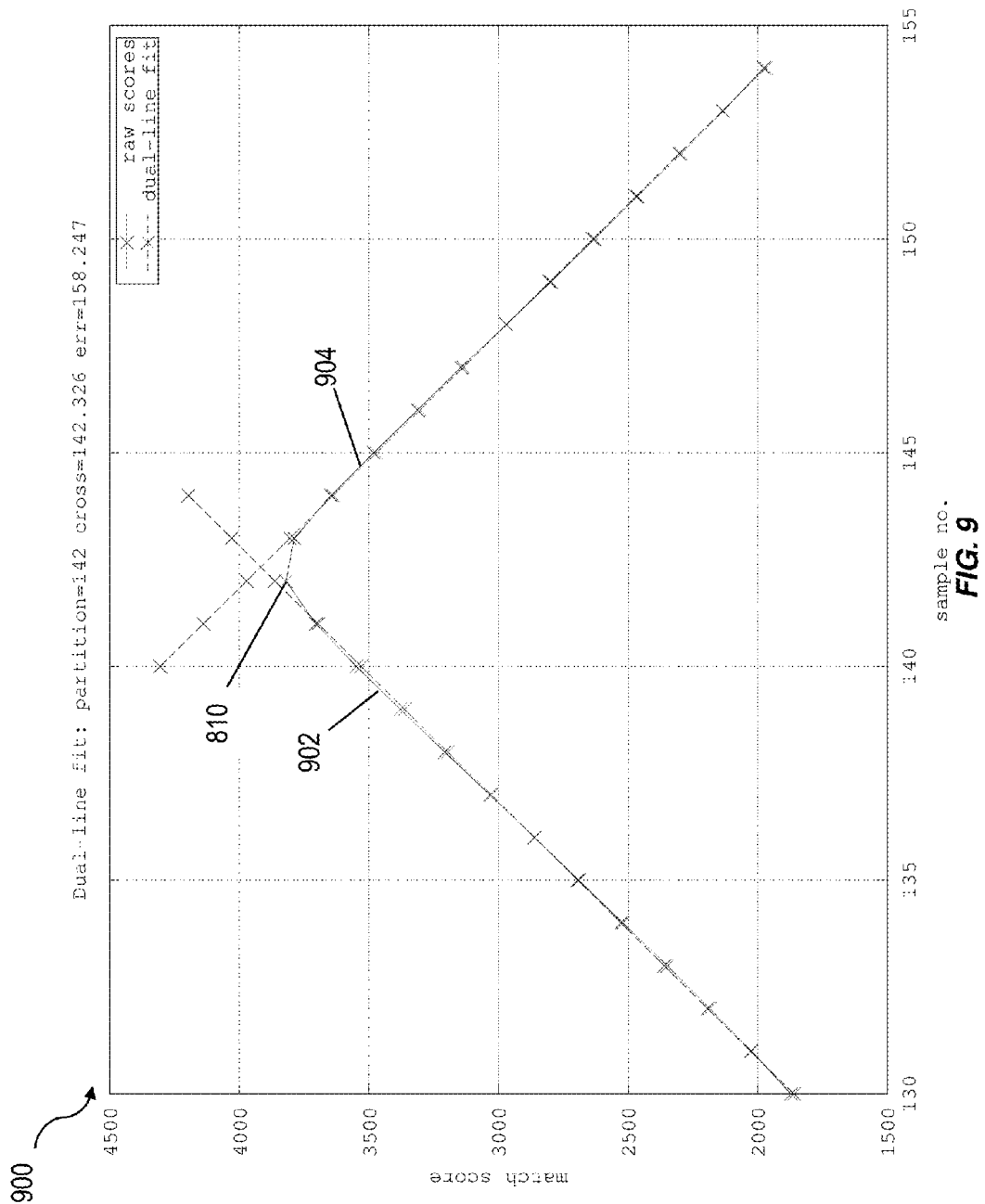
FIG. 9 is a plot of the score sequence having two straight lines and fitted to the score sequence samples that are in proximity to the peak score sample.

FIG. 9 is a plot 900 of the score sequence 808 having two straight lines 902 and 904 fitted to the score sequence 808 samples that are in proximity to the peak score sample 810, according to some implementations of the current subject matter. The two lines 902 and 904 intersect at 142.326, which can be used as the fine time-delay difference between the example baseband signal 101 and the example amplified signal 103.

Figure 10:
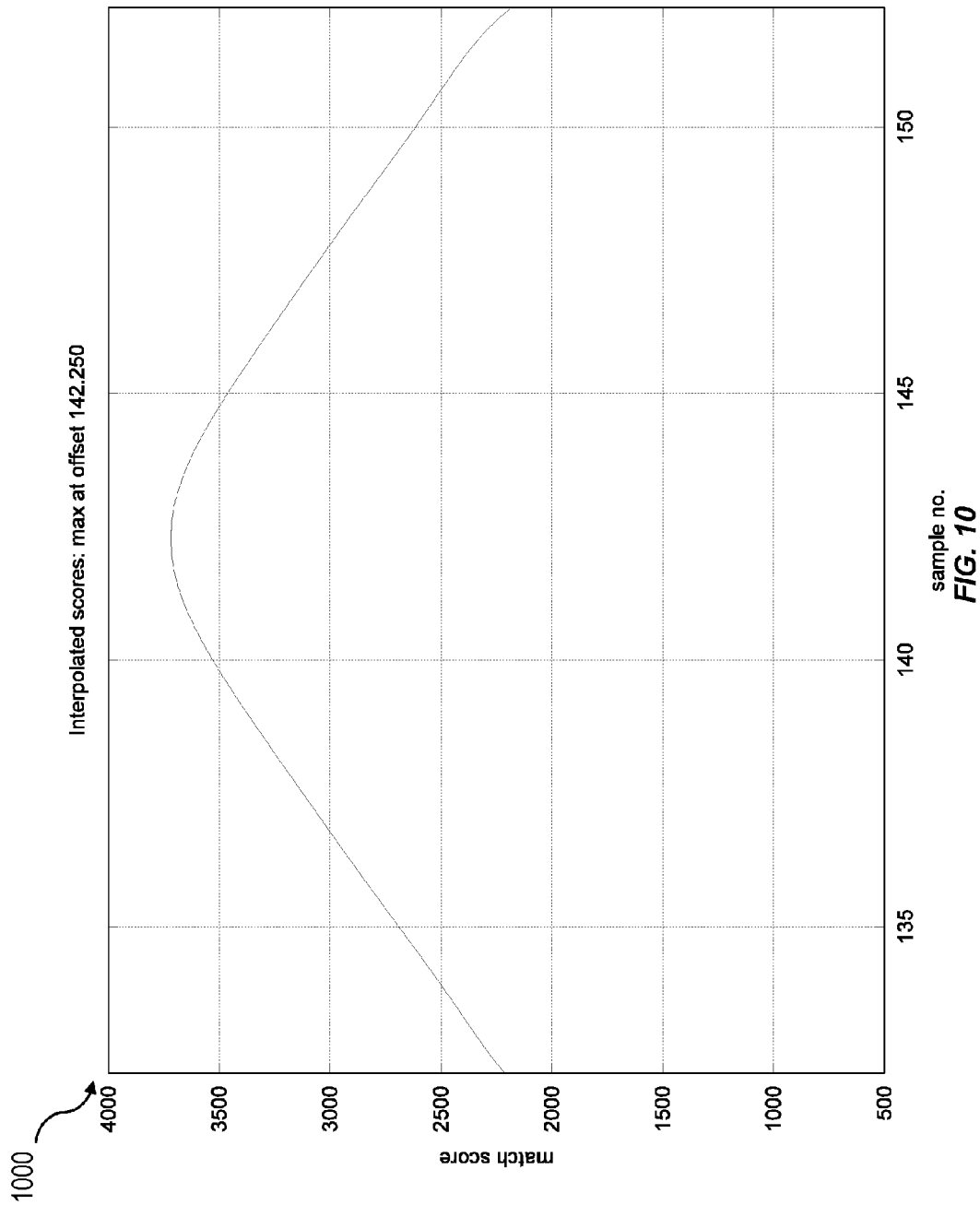
FIG. 10 is a plot of interpolated score values (using a factor 16 interpolation of the example score sequence) at sample numbers in proximity to the peak score, in accordance with some example implementations.

FIG. 10 is a plot 1000 of interpolated score values (using a factor 16 interpolation of the example score sequence 808) at sample numbers in proximity to the peak score 810, according to some implementations of the current subject matter. The interpolated point having the highest score corresponds to a time of 142 plus 4 fractional points. This gives a fine time-alignment estimate of: $T_{interp}$=142 4/16.

Figure 11:
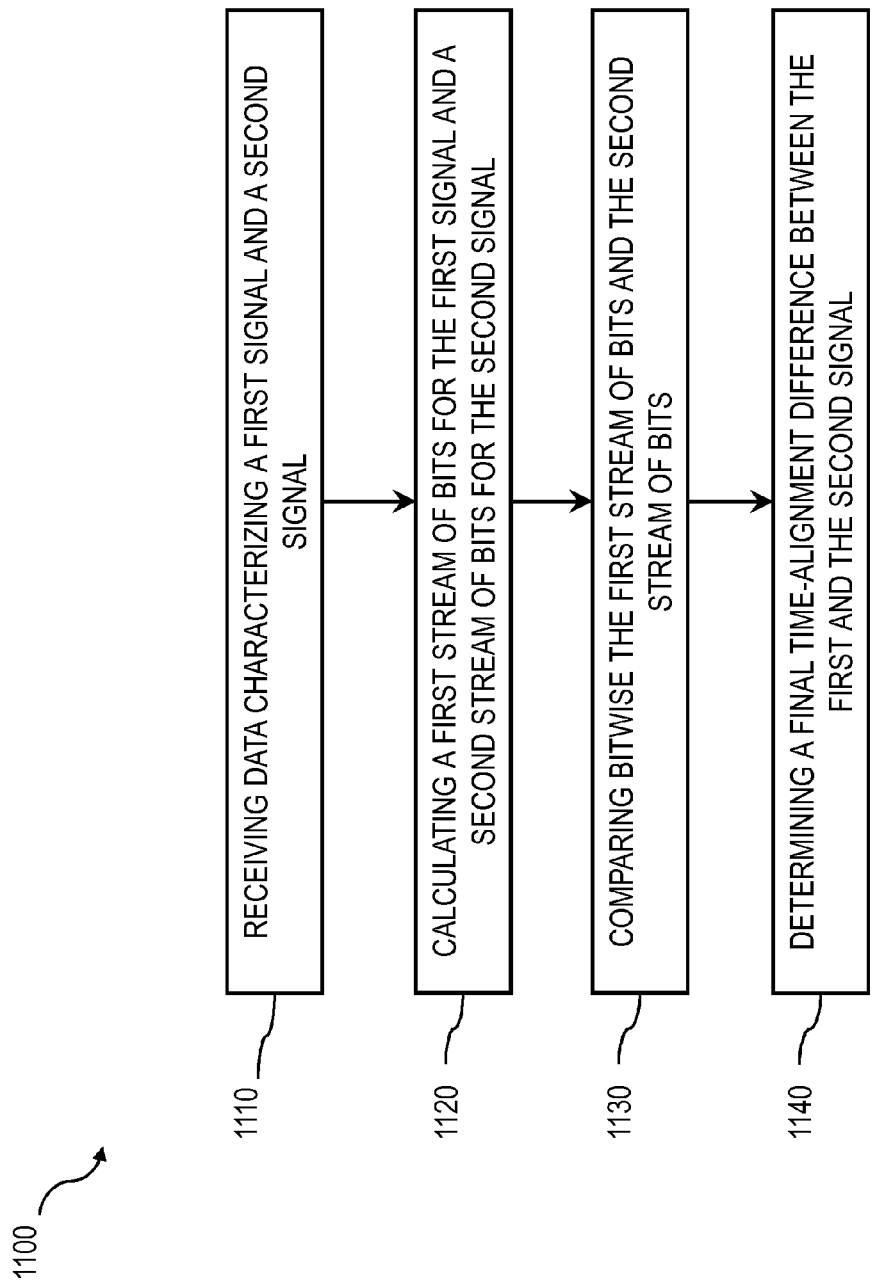
FIG. 11 is a process flow diagram illustrating a method of determining a time-alignment difference, in accordance with some example implementations.

FIG. 11 is a process flow diagram illustrating an exemplary method 1100 of determining a time-alignment difference, according to some implementations of the current subject matter. A first signal and a second signal can be received at 1110. The first signal can be, for example, a complex valued baseband signal for transmission in a radio transmitter. The second signal can be, for example, a processed and amplified signal corresponding to the first signal and having an unknown time-delay with respect to the first signal.

A first stream of bits can be calculated for the first signal and a second stream of bits can be calculated for the second stream of bits at 1120. Each bit in the first stream of bits can characterize a slope of the power of the first signal (e.g., whether the power of the first signal is increasing or decreasing) and each bit in the second stream of bits can characterize a slope of the power of the second signal (e.g., whether the power of the second signal is increasing or decreasing).

The first stream of bits and the second stream of bits can be compared bitwise at 1130. The comparison can include determining whether the bits are equal and can be performed at a number of time-alignment differences. The comparison can include summing the occurrences of matching bits to form a score for each of the number of time-alignment differences.

A final time-alignment difference can be determined at 1140 from the comparison. The final time-alignment difference can include an integral or coarse time alignment difference having the highest score. A non-integral or fine time alignment difference can be determined using, for example, line fitting or interpolation of the score to determine a maximum score.

The subject matter described herein provides many advantages. For example, computational power required to align signals is greatly reduced. Additionally, reductions in cost are also achieved. The subject matter described herein does not require calculation of a variance of the difference between the two signals.

The number of basic additions/multiplications performed can be reduced by the current subject matter. For example, consider a comparison between the current subject matter and known techniques for a case with: an interpolation factor of 16; signals each consisting of 1000 samples; and a search over a range of 16 sample points for the best time-alignment value. When interpolation by a factor of 16 is used in both methods: putting 15 zeroes between each point and filtering with a 129 tap filter (since most points are zero the multiplications need not be done) so 7 multiplications and 6 additions are performed for each point calculated. For an example implementation of the current subject matter: determining two signatures: two signals: 2000 multiplications, 2000 integer comparisons; determining scores from the signature (for each of 16 points, slide one shifted signature over the other and count the matching bits): 16*1000 bit comparisons; and interpolating to determine a final time alignment value (interpolation over 16 points): 16*140 multiplications and 16*120 additions. In contrast, more traditional techniques of time-alignment include for one point (no interpolation required): a. calculate variance: 1000 multiplications, 1000 additions, 1000 subtractions; for each of 15 points: interpolate 1000 points: 15*7000 multiplications and 15*6000 additions; and calculate variance: 15*1000 multiplications, 15*1000 additions, 15*1000 subtractions. If the computational requirement of a bit or integer comparison or a subtraction is equated with an addition then the current subject matter would require 4240 multiplications and 18000 additions while traditional techniques would require 121000 multiplications and 122000 additions.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the implementations described above can be directed to various combinations and subcombinations of the disclosed features and/or combinations and subcombinations of several further features disclosed above. In addition, the logic flows depicted in the accompanying figures and described herein do not require the particular order shown, or sequential order, to achieve desirable results. Other embodiments may be within the scope of the following claims.

What is claimed is:

1. A computer-implemented method, comprising:
receiving data characterizing a first signal and a second signal;
calculating, based on the received data, a first stream of bits for the first signal and a second stream of bits for the second signal, wherein each bit in the first stream of bits characterizes a slope of a power of the first signal and each bit in the second stream of bits characterizes a slope of a power of the second signal;
comparing bitwise the first stream of bits and the second stream of bits at a plurality of time-alignment differences for matching bits; and
determining, based on the comparing, a final time-alignment difference between the first signal and the second signal;
determining, at each of the plurality of time-alignment differences, a sum of matching bits;
wherein the determining the final time-alignment difference includes at least one of the following:
estimating a maximum match by interpolating the sum of matching bits at each of the plurality of time-alignment differences to determine the final time-alignment difference where the sum of matching bits is at a maximum;
estimating a maximum match by fitting straight lines to the sum of matching bits over the plurality of time-alignment differences near a peak of the sum of matching bits; and
determining the final time-alignment difference to include a coarse time-alignment difference and a fractional time-alignment difference, the coarse time-alignment difference being an integral delay corresponding to one of the plurality of time-alignment differences having the largest number of matching bits and the fractional time-alignment difference being determined by interpolation or line-fitting of the sum of matching bits at the plurality of time-alignment differences;
wherein at least one of the receiving, the calculating, the comparing, the determining the final time-alignment difference, the determining the sum of matching bits is performed by at least one processor of at least one computing system.

2. The method of claim 1, further comprising
aligning in time the first signal and the second signal by delaying one of the first signal and the second signal by the final time-alignment difference.

3. The method of claim 1, wherein the first signal is a complex valued data signal for transmission in a radio transmitter.

4. The method of claim 1, further comprising
computing coefficients for digital pre-distortion or quadrature modulation error-correction (QMC) of the first signal using the final time-alignment difference.

5. A system comprising:
at least one data processor;
memory storing instructions which, when executed by the at least one data processor, causes the at least one data processor to perform operations comprising:
receiving data characterizing a first signal and a second signal;
calculating, based on the received data, a first stream of bits for the first signal and a second stream of bits for the second signal, wherein each bit in the first stream of bits characterizes a slope of a power of the first signal and each bit in the second stream of bits characterizes a slope of a power of the second signal;
comparing bitwise the first stream of bits and the second stream of bits at a plurality of time-alignment differences for matching bits; and
determining, based on the comparing, a final time-alignment difference between the first signal and the second signal;

determining, at each of the plurality of time-alignment differences, a sum of matching bits;
wherein the determining the final time-alignment difference includes at least one of the following:
  estimating a maximum match by interpolating the sum of matching bits at each of the plurality of time-alignment differences to determine the final time-alignment difference where the sum of matching bits is at a maximum;
  estimating a maximum match by fitting straight lines to the sum of matching bits over the plurality of time-alignment differences near a peak of the sum of matching bits; and
  determining the final time-alignment difference to include a coarse time-alignment difference and a fractional time-alignment difference, the coarse time-alignment difference being an integral delay corresponding to one of the plurality of time-alignment differences having the largest number of matching bits and the fractional time-alignment difference being determined by interpolation or line-fitting of the sum of matching bits at the plurality of time-alignment differences.

6. The system of claim 5, the operations further comprising
  aligning in time the first signal and the second signal by delaying one of the first signal and the second signal by the final time-alignment difference.

7. The system of claim 5, wherein the first signal is a complex valued data signal for transmission in a radio transmitter.

8. The system of claim 5, the operations further comprising
  computing coefficients for digital pre-distortion or quadrature modulation error-correction (QMC) of the first signal using the final time-alignment difference.

9. A non-transitory computer program product storing instructions, which when executed by at least one data processor of at least one computing system, implement a method comprising:
  receiving data characterizing a first signal and a second signal;
  calculating, based on the received data, a first stream of bits for the first signal and a second stream of bits for the second signal, wherein each bit in the first stream of bits characterizes a slope of a power of the first signal and each bit in the second stream of bits characterizes a slope of a power of the second signal;
  comparing bitwise the first stream of bits and the second stream of bits at a plurality of time-alignment differences for matching bits; and
  determining, based on the comparing, a final time-alignment difference between the first signal and the second signal;
  determining, at each of the plurality of time-alignment differences, a sum of matching bits;
  wherein the determining the final time-alignment difference includes at least one of the following:
    estimating a maximum match by interpolating the sum of matching bits at each of the plurality of time-alignment differences to determine the final time-alignment difference where the sum of matching bits is at a maximum;
    estimating a maximum match by fitting straight lines to the sum of matching bits over the plurality of time-alignment differences near a peak of the sum of matching bits; and
    determining the final time-alignment difference to include a coarse time-alignment difference and a fractional time-alignment difference, the coarse time-alignment difference being an integral delay corresponding to one of the plurality of time-alignment differences having the largest number of matching bits and the fractional time-alignment difference being determined by interpolation or line-fitting of the sum of matching bits at the plurality of time-alignment differences.

10. The non-transitory computer program product of claim 9, the method further comprising
  aligning in time the first signal and the second signal by delaying one of the first signal and the second signal by the final time-alignment difference.

11. The non-transitory computer program product of claim 9, wherein the first signal is a complex valued data signal for transmission in a radio transmitter.

12. The non-transitory computer program product of claim 9, the method further comprising
  computing coefficients for digital pre-distortion or quadrature modulation error-correction (QMC) of the first signal using the final time-alignment difference.

* * * * *